Oct. 21, 1958 D. B. ANDERSON 2,857,574

TUNABLE ELECTRICAL RESONATOR

Filed Dec. 23, 1954 2 Sheets-Sheet 1

United States Patent Office 2,857,574
Patented Oct. 21, 1958

2,857,574

TUNABLE ELECTRICAL RESONATOR

Dean B. Anderson, New Hyde Park, N. Y., assignor to Hazeltine Research, Inc., Chicago, Ill., a corporation of Illinois Application December 23, 1954, Serial No. 477,316

21 Claims. (Cl. 332—29)

GENERAL

Figure 2A:
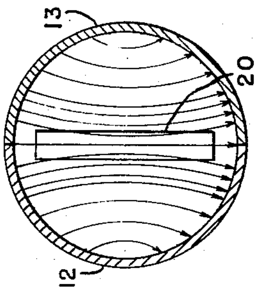

This invention is directed to tunable electrical resonators and, more particularly, to tunable microwave resonators having fixed physical lengths yet having controllable electrical lengths for establishing the resonant frequency thereof. Such resonators have utility in a variety of microwave applications and may, for example, be employed for frequency-control purposes such as in wavemeters or may be utilized for stabilizing or for frequency-modulating oscillators. Accordingly, the invention will be described in those environments.

The usual wave guide comprises a hollow member having a conductive inner surface for guiding wave signals along the length thereof. Heretofore, it has been the practice to tune such a guide mechanically as by rotating a copper paddle in the guide, by altering the geometric or physical length of the guides as by flexing walls thereof or moving telescopic portions, or by adjusting the position of a movable piston fitted within the inner walls of the guide to control the length thereof. Although these expedients have proved satisfactory for many applications, they do not afford as convenient a control of the frequency of the resonator as may be desired for other applications. For example, moving parts are subject to wear and electrical noise and also require manual or motor-driven means to effect the necessary relative movement of those parts. High-speed operation of such parts is often impractical. Thus, if it is desired to frequency-modulate a microwave oscillator, as by varying the resonant frequency of its resonator at a rate of about 50 kilocycles per second, mechanical expedients are unsatisfactory.

It is an object of the invention, therefore, to provide a new and improved tunable electrical resonator which avoids one or more of the above-mentioned disadvantages and limitations of prior such resonators.

It is another object to the invention to provide a new and improved electrical resonator which requires no moving parts to adjust the resonant frequency thereof.

It is a further object of the invention to provide a new and improved tunable electrical resonator of fixed dimensions.

It is a still further object of the invention to provide a new and improved electrical resonator which is capable of having its tuning adjusted at a rate of many thousand cycles per second.

It is an additional object of the invention to provide a new and improved tunable electrical resonator which is relatively simple in construction and inexpensive to manufacture.

In accordance with the invention, a tunable electrical resonator for translating wave signals within a range of frequencies comprises a wave guide having physical dimensions selected so that it resonates in a desired mode at a frequency within the range and having a reflecting impedance discontinuity at one end thereof. As employed throughout the specification and claims, the term "wave guide" is employed in a broad sense to denote any structure which functions as a boundary for electromagnetic waves and is effective to direct the propagation of those waves along a predetermined path. The resonator also includes means at the other end of the guide for propagating therealong for reflection by the aforesaid discontinuity a wave signal which is in the aforesaid range and has a predetermined initial plane of polarization. The resonator further includes means in the guide responsive to the plane or polarization of the aforesaid propagated wave as incident thereon for modifying the phase velocity thereof. The tunable electrical resonator additionally includes means for changing with reference to the aforesaid initial plane the plane of polarization of the aforesaid wave signal incident on the above-mentioned modifying means, thereby to control the electrical length and hence the resonant frequency of the guide.

For a better understanding of the present invention, together with other and further objects thereof, reference is had to the following description taken in connection with the accompanying drawings, and its scope will be pointed out in the appended claims.

Figure 2B:
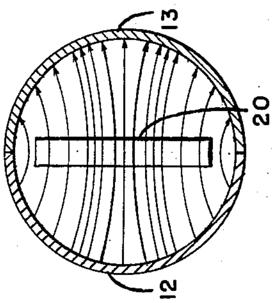
Figure 1:
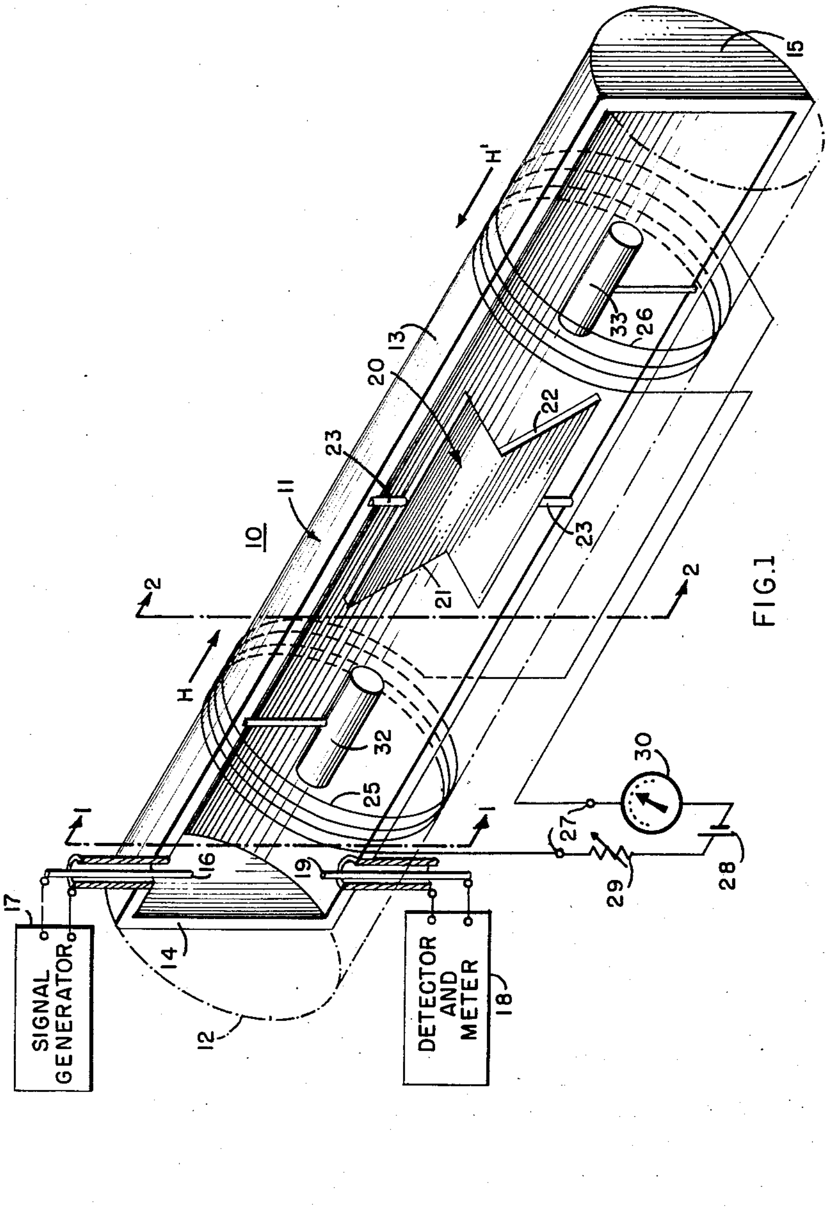
Figures 3, 4:
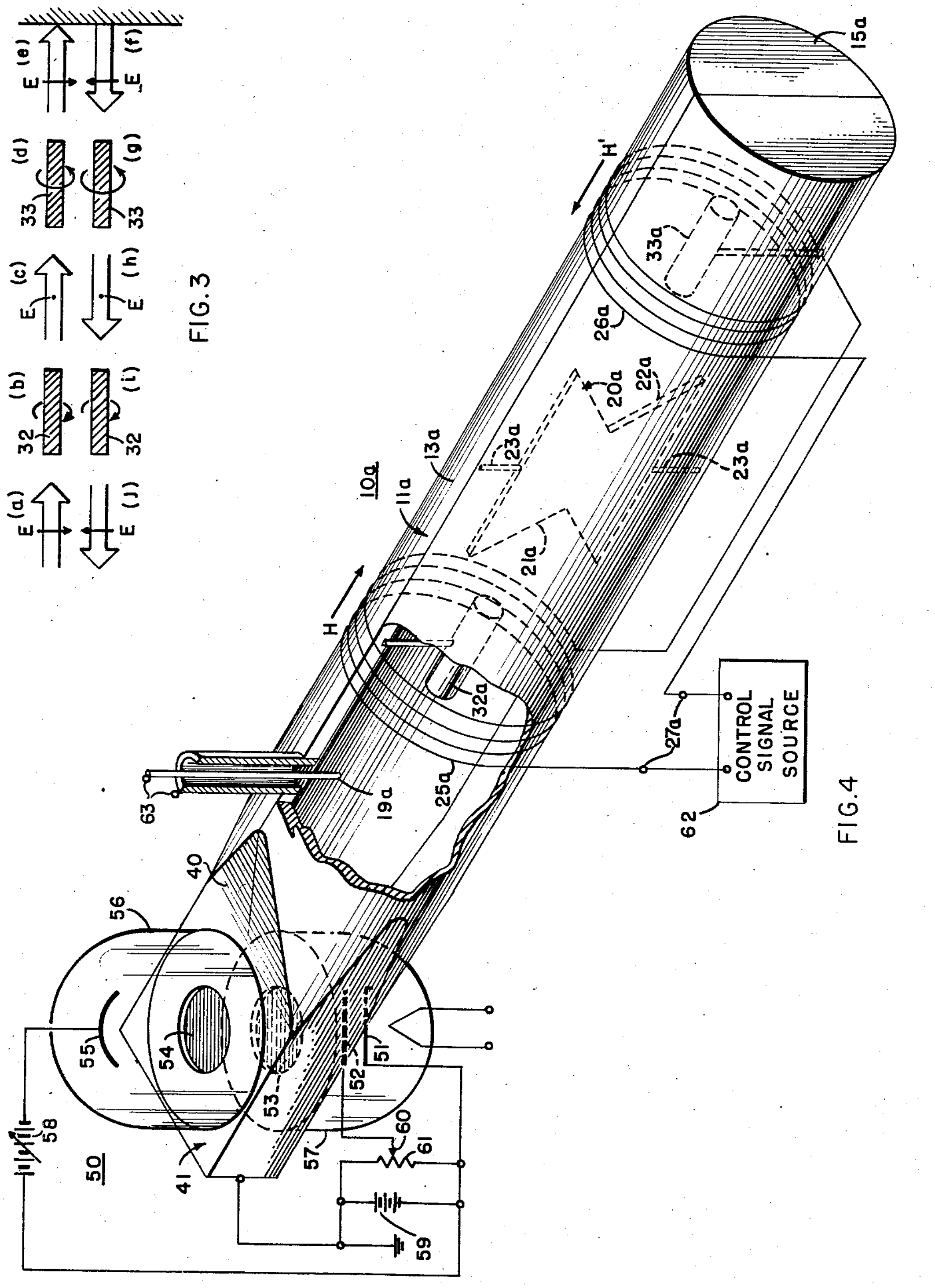

Referring to the drawings:

Fig. 1 is a schematic diagram of a wavemeter including a perspective representation of one-half of a tunable electrical resonator in accordance with the present invention;

Figs. 2*a* and 2*b* are representations of electric field patterns as they appear at sections taken along the lines 1—1 and 2—2 of Fig. 1;

Fig. 3 is a graph utilized in explaining the operation of the resonator of Fig. 1, and Fig. 4 is a diagrammatic representation of an ultra-high-frequency oscillator employing a tunable electrical resonator in accordance with the invention.

*Description of wavemeter of Fig. 1 including tunable electrical resonator*

Referring now more particularly to Fig. 1 of the drawings, the wavemeter there represented includes a tunable electrical resonator 10 for translating wave signals within a range of high frequencies. This resonator includes a wave guide 11 which may comprise a pair of mating hollow half cylindrical members 12 and 13, the former being represented in dot-dash line construction to facilitate illustration. Guide 11 has a conductive inner wall and has physical dimensions selected so that it resonates in a desired mode at a frequency in the aforesaid range. For example, the wave guide 11 may be a circular guide having a physical length and a cross section selected so that it resonates in the $TE_{11}$ mode of propagation at a frequency of about 6,000 megacycles. The guide 11 may have a fixed length of an integral multiple of one-half wave length at that frequency and has at least one reflecting impedance discontinuity at an end thereof and, for the embodiment represented, has two closed end walls 14 and 15 each constituting a reflecting impedance discontinuity.

The wave guide 11 has means at one end thereof, namely a conventional probe 16 near the end wall 14, for propagating along the guide for reflection by the discontinuity comprising end wall 15 a wave signal which is in the aforesaid range and has a predetermined initial field distribution or plane of polarization. A signal generator 17 is coupled in a conventional manner to the probe 16 from launching in the wave guide a linearly polarized wave signal in which the plane of electric polarization is as represented by the electric field pattern in Fig. 2*a*. Accordingly, the electric lines of force extend substantially vertically across the guide. A detector and meter unit 18 of conventional construction is coupled to a pickup probe 19 which is disposed diametrically opposite the probe 16.

The resonator 10 also includes means in the wave guide 11 responsive to the plane of polarization of the propagated wave as incident thereon for modifying the phase velocity thereof. While this means may take various forms, a dielectric sheet or vane 20, preferably having shaped impedance-matching ends such as the notched ends 21 and 22 for substantially matching the impedance of the guide, is diametrically mounted within the guide as by dielectric supports 23, 23 and is responsive to the plane of polarization of the propagating wave as incident thereon for modifying the phase velocity thereof. In the embodiment of the invention represented in Fig. 1, the dielectric sheet 20 is substantially parallel to the electric lines of force as represented in Fig. 2*a*.

The tunable electrical resonator 10 of Fig. 1 additionally includes polarization control means for changing with respect to the aforesaid initial plane of polarization the plane of polarization of the wave signal incident on the modifying means or dielectric sheet 20, thereby to control the electrical length and hence the resonant frequency of the wave guide 11. This means may include a single winding but for best operation preferably comprises a pair of interconnected windings or solenoids 25 and 26 which are disposed about the guide 11 to induce magnetic fields in opposite senses. The windings are connected to the supply terminals 27, 27 of a source of unidirectional potential of adjustable magnitude comprising a battery 28, an adjustable resistor 29, and an ammeter 30. The polarization control means also includes a member in the wave guide and for best operation includes a pair of members having magnetic properties for producing in the guide a controllable magnetic field substantially parallel to the axis thereof to orient about that axis the plane of polarization of the wave signal incident on the dielectric sheet 20. These members comprise ferromagnetic rods 32 and 33 which, when responsive to a magnetizing current produced by the flow of energy in the windings 25 and 26, are effective to produce the Faraday rotation of a polarized wave incident thereon. Ferromagnetic materials such as ferrites have proved to be particularly useful for this purpose. Ferrites are materials which are becoming quite well known in the electrical art and consist of metallic oxides having a spinel structure and the general chemical formula of $XFe_2O_4$, where X represents a bivalent metal such as magnesium, nickel, or cobalt. The ferrite rods 32, 33 are preferably axially disposed in the wave guide beneath the windings 25 and 26 and appear on opposite sides of the dielectric sheet 20. These ferrite rods and their windings 25 and 26 are often referred to in the microwave art as ferrite rotators or microwave gyrators because of their ability to effect the Faraday rotation of polarized electromagnetic waves.

*Operation of wavemeter including resonator of Fig. 1*

In considering the operation of the wavemeter of Fig. 1 for determining the frequency of the output signal of the wave-signal generator 17, it will be assumed initially that the resistor 29 is adjusted so that the source of unidirectional potential 28 coupled to the terminals 27, 27 supplies a relatively large energizing current to the windings 25 and 26. A wave signal supplied by the generator 17 to the exciting probe 16 appears in the wave guide 11 as a polarized wave signal which is launched down the guide toward the closed end 15. For convenience, it will be assumed that the diameter of the circular wave guide 11 is large enough to support the $TE_{11}$ mode of propagation but is not great enough to support a higher mode. The initial field distribution or plane of polarization is such that the electric field may have in the plane at the line 1—1 of Fig. 1 the pattern represented in Fig. 2*a* of the drawings. To facilitate an understanding of an explanation which follows, this pattern is represented in relation to an end view of the dielectric sheet 20. In Fig. 3, at (*a*) the plane of polarization is represented by the vertical arrow E while the propagated wave is represented by the large horizontal arrow.

As the polarized wave proceeds down the wave guide and comes within the influence of the axial magnetic field (represented in Fig. 1 for convenience of illustration by the arrow H above the guide 11) developed in the ferrite member 32 by the energized winding 25, the plane of polarization of the advancing wave is oriented or rotated about the axis of the guide by the phenomenon referred to as the Faraday rotation of a polarized wave. Assuming that the intensity of the current established by the setting of resistor 29 is such that the magnetic field which then exists in the ferrite member 32 is sufficient to rotate the plane of polarization 90° in a counterclockwise direction to the position represented in Fig. 2*b*, it will be seen that the electric vectors or lines of force are normal to the plane of the dielectric sheet 20. Since these lines of force easily pass through the thickness of this thin sheet, the latter has a minimum effect on the phase velocity of the wave being propagated toward the closed end 15.

When the wave reaches the region of influence of the ferrite member 33 and its winding 26, the axial magnetic field developed in the member 33 (represented for convenience by the arrow H' above the wave guide 11 and having a sense opposite to that of the field H because of the direction of the winding 26) effects a 90° clockwise rotation of the plane of polarization. This rotation is represented by the arrow at (*d*) in Fig. 3 so that the plane of polarization of the wave incident on the end wall 15 is as represented by the vector E at (*e*) of Fig. 3. Thus, the polarization of the wave translated down the wave guide 11 from the region of end wall 14 has undergone two 90° rotations in opposite directions, thereby bringing its plane of polarization back to the initial plane at the reflecting end wall 15.

While the plane of polarization of the wave reflected by the end wall 15 remains the same, the electric vector undergoes a 180° phase reversal as represented by the arrow E at (*f*) of Fig. 3. As the reflected wave proceeds down the wave guide 11 toward the other end wall 14, it comes within the influence of the energizing winding 26 and the ferrite member 33. The plane of polarization of the reflected wave is rotated 90° in the same sense as the wave first incident on the ferrite member 33 and this rotation is indicated at (*g*) in Fig. 3. The plane of polarization of the reflected wave incident on the dielectric sheet is normal to the plane of that sheet and the electric vector is represented at (*h*) of Fig. 3 by the dot E. Again the sheet 20 has a minimum effect on the phase velocity of the wave incident thereon for the reasons previously mentioned. As the reflected wave passes through the region of influence of the axial magnetic field H created in the ferrite member 32, the plane of polarization of that field is rotated another 90° in the sense indicated in Fig. 3 at (*i*) so that the reflected wave indicated on the end wall 14 has the same polarization as the wave emanating from the probe 16 but has a 180° phase reversal. This incident wave is reversed in phase by the end wall 14 and thereupon has the phase relationship represented in Fig. 3 at (*a*). The reflected wave is in a phase to be reinforced by the wave then introduced into the wave guide 11 by the exciting probe 16 and the described wave travel in the guide is again repeated and oscillations build up in the wave guide 11.

The probe 19 intercepts the wave-signal oscillations in the guide and applies them to the detector and meter 18. As is customary in wavemeter operation, unit 18 provides a maximum indication on the meter thereof when the resonant frequency of the tunable resonator 10 corresponds to that of the wave-signal generator 17. It will be assumed that for the condition wherein the windings 25 and 26 carry sufficient current to effect a 90° rotation of the plane of polarization of a wave in the guide 11, the unit 18 does not show a maximum indication on the meter thereof. When the windings 25 and 26 are energized so as to cause the ferrite members 32 and 33 to produce a relatively large rotation such as 90° of the plane of polarization of a translated wave, the wave guide 11 has an electrical length which, for the purpose of this explanation, may be considered as its shortest electrical length.

As the value of the current in the windings 25 and 26 is reduced, the intensity of the axial magnetic fields H and H′ produced in the ferrite members 32 and 33 is also reduced. This, in turn, is effective to reduce the angle of rotation of the plane of polarization of the wave transmitted by the guide. When no current is flowing in the windings 25 and 26, the plane of polarization of the wave incident on the dielectric sheet 20 is as represented in Fig. 2*a* wherein the electric vectors are substantially parallel to the plane of that sheet. For this condition, the electric field distribution is quite concentrated at the diameter of the wave guide and this electric field now must pass through the width of the dielectric sheet 20 which width is many times greater than its thickness. The action of the dielectric sheet slows down the propagation of the wave in either direction in the guide and causes the existence of a greater number of wave lengths in the dielectric sheet. When no current flows in the windings 25 and 26, therefore, the electrical length of the wave guide 11 is greatest and the resonant frequency of the guide is lowest. Intermediate variations of current in the windings 25 and 26 will alter the rotation of the plane of polarization of the translated wave to an extent which is proportional to the exciting current in those windings and will, in turn, cause the electric vectors to cut across the width of the dielectric sheet 20 to an extent which is related to the intensity of the magnetizing current. Consequently, the windings 25 and 26, the ferrite members 32 and 33, the dielectric sheet 20, and the energizing source coupled to the terminals 27, 27 may be looked upon as a polarization control means for controlling the electrical length of the wave guide 11 without altering the physical length thereof.

By adjusting the magnitude of the current in the windings 25 and 26, the electrical length and, hence, the resonant frequency of the guide 11 may be adjusted so that its resonant frequency corresponds to the frequency of the output signal of the generator 17. This condition will be indicated when the meter of unit 18 develops a maximum indication and the position of the indicator of the ammeter 30 may be noted since the meter may be calibrated in terms of frequency.

*Description of oscillator of Fig. 4 including tunable resonator*

Referring now to Fig. 4 of the drawings, there is represented a high-frequency oscillator including a tunable resonator which is generally similar to the resonator of Fig. 1. Accordingly, corresponding elements of the Fig. 4 device are designated by the same reference numerals employed in Fig. 1 but with the subscript "*a*."

The oscillator of Fig. 4 is of the velocity-modulation type and, more particularly, is of the reflex klystron type. The wave guide 11*a* has a smoothly tapered matching transition portion 40 connected to the end opposite the end wall 15*a* (wall 14 of Fig. 1 is omitted) for converting from a circular wave guide to a rectangular end portion 41. The lengths of the wave guide 11*a* together with the transition portion 40 and the end portion 41 are selected to have a length of one-half wave length at a frequency within the operating range of the oscillator. Glass envelopes 56, 57 are bonded to the upper and lower surfaces of the portion 41 and enclose a conventional cathode 51, an accelerator electrode 52, buncher and catcher electrodes 53 and 54 formed in the lower and upper walls, respectively, of the end portion 41, and a repeller electrode 55. The rectangular end portion 41 is connected to the positive terminal of a source of potential 59 and the cathode 51 is connected to the negative terminal thereof. A tap 60 on a voltage divider 61 connected across the source 59 is connected to the accelerator electrode 52 and the repeller electrode 55 is connected in a conventional manner to a negative terminal of a source 58 which may be of adjustable magnitude. The rectangular portion 41 may, for example, be dimensioned to support the dominant $TE_{10}$ mode of operation while the circular wave guide 11*a* may support the $TE_{11}$ mode of propagation. For the purpose of controlling the frequency of the oscillator, such as to frequency-modulate the output signal thereof, a suitable control-signal source 62 is connected to the terminals 27*a*, 27*a* associated with the windings 25*a* and 26*a*. This control-signal source may be a source of unidirectional potential of adjustable magnitude for modifying the frequency of the oscillator as for automatic-frequency-control purposes or may comprise a periodic-potential source or a source of a varying potential for frequency-modulating the oscillator. For some applications, unit 62 may supply recurrent pulses at a high repetition rate for effecting a fast control of the frequency of the oscillator. Output signals may be derived from terminals 63, 63 associated with an output probe 19*a*.

*Operation of oscillator of Fig. 4*

The single resonator of the oscillator comprising the rectangular end portion 41 serves both as the buncher and the catcher of the reflex klystron oscillator. Electrons supplied by the cathode 51 are accelerated by the electrode 52 and pass through the resonator by way of the control electrodes 53 and 54 and their direction of motion is reversed by means of the repeller electrode 55 which has a negative potential applied thereto. By proper adjustment of the voltages applied to the various electrodes of the klystron, the electrons are made to pass through the end portion 41 of the resonator at the proper time so that energy is delivered to the resonator. A wave in the dominant $TE_{10}$ mode is developed in the rectangular end portion 41 and by means of the small end portion 40 goes over into the dominant $TE_{11}$ mode in the circular wave guide 11*a*. This wave proceeds down the guide and is reflected by the end wall 15*a* whereupon it traverses to the end of the guide 11*a* and enters the end portion 41 where it is augmented by energy developed by the klystron so that oscillations build up in the resonator. The extent of the rotation of the plane of polarization of the wave traversing the wave guide 11*a* is proportional to the current flowing in the windings 25*a* and 26*a* and this current, in turn, controls the effective electrical length of the resonator in the manner explained above in connection with the Fig. 1 embodiment of the invention. The unidirectional control signal of controllable magnitude supplied by the source 62 through the terminals 27*a*, 27*a* may be utilized to effect relatively slow changes in the frequency of the oscillator. For frequency-modulating the output signal derived at the output terminals 63, 63 of the oscillator, a suitable control signal, such as a periodic potential, may be applied by the source 62 to the terminals 27*a*, 27*a*. This applied control signal causes the frequency of the oscillator to be varied over a relatively wide range of frequencies. Minor adjustments of the frequency of the oscillator may be realized by adjusting the magnitude of the voltage applied by the source 58 to the repeller electrode 55 of the oscillator tube.

From the foregoing description, it will be seen that an electrical resonator in accordance with the present invention is tunable over a range of operating frequencies without altering the physical dimensions of the resonator. It will also be clear that a resonator embodying the present invention is capable of having its tuning electrically adjusted at a fast rate so that the resonator is particularly suitable for frequency-modulation applications.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

2. A tunable electrical resonator for translating wave signals within a range of frequencies comprising: a circular wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

3. A tunable electrical resonator for translating wave signals within a range of frequencies comprising: a circular wave guide having a physical length and cross section selected so that it resonates in the $TE_{11}$ mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

4. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; a dielectric sheet in said guide responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

5. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide intermediate said propagating means and said one end and responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

6. A tunable electrical resonantor for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide having shaped impedance-matching ends substantially matching the impedance of said guide and responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

7. A tunable electrical resonator for translating wave signals within a range of frequencies comprising: a hollow wave guide having physical dimensions selected so that it resonates in a desired mode at a frequency within said range and having at one end thereof a closed end constituting a reflecting impedance discontinuity; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

8. A tunable electrical resonator for translating wave signals within a range of frequencies comprising: a hollow wave guide having physical dimensions selected so that it resonates in a desired mode at a frequency within said range and having closed ends constituting reflecting impedance discontinuities; means at the one end of said guide for propagating therealong for reflection by the discontinuity at the other end a wave signal which is in said range and has a predetermined initial plane of polarization; means in said guide responsive to the plane of polarization of said propagated wave as incident thereon for modifying the phase velocity thereof; and means for changing with reference to said initial plane the plane of polarization of said wave signal incident on said modifying means, thereby to control the electrical length and hence the resonant frequency of said guide.

9. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave signal as incident thereon for modifying the phase velocity thereof; and means for producing in said guide a controllable magnetic field to change with reference to said initial plane the plane of polarization of said wave signal incident on said modifying means, thereby to control the electrical length and hence the resonant frequency of said guide.

10. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave signal as incident thereon for modifying the phase velocity thereof; and means including a member in said guide having magnetic properties for producing in said guide a controllable magnetic field to change with reference to said initial plane the plane of polarization of said wave signal incident on said modifying means, thereby to control the electrical length and hence the resonant frequency of said guide.

11. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave signal as incident thereon for modifying the phase velocity thereof; and means including a member in said guide having magnetic properties for producing in said guide a controllable magnetic field substantially parallel to the axis thereof to orient about said axis said plane of polarization of said wave signal incident on said modifying means, thereby to control the electrical length and hence the resonant frequency of said guide.

12. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave signal as incident thereon for modifying the phase velocity thereof; a winding disposed about said guide; and a member in said guide arranged to be magnetically coupled to said winding and having magnetic properties for producing in said guide a controllable magnetic field substantially parallel to the axis thereof to rotate about said axis said plane of polarization of said wave signal incident on said modifying means, thereby to control the electrical length and hence the resonant frequency of said guide.

13. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; and means including a pair of members in said guide disposed at opposite ends of said modifying means and having magnetic properties for producing in said guide controllable opposing magnetic fields substantially parallel to the axis thereof to orient about said axis said plane of polarization of said wave signal incident on said modifying means, thereby to control the electrical length and hence the resonant frequency of said guide.

14. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; individual windings wound in opposite senses and disposed about said guide near opposite ends thereof; and a pair of members in said guide disposed at opposite ends of said modifying means and magnetically coupled to said windings and having magnetic properties for producing in said guide controllable opposing magnetic fields substantially parallel to the axis thereof to orient about said axis said plane of polarization of said wave signal incident on said modifying means, thereby to control the electrical length and hence the resonant frequency of said guide.

15. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; winding means disposed about said guide; a source of unidirectional potential of adjustable magnitude coupled to said winding means for developing therein a controllable magnetizing current; and a pair of members in said guide disposed at opposite ends of said modifying means and having magnetic properties responsive to said magnetizing current for producing in said guide controllable opposing magnetic fields substantially parallel to the axis thereof to orient about said axis said plane of polarization of said wave signal incident on said modifying means, thereby to control the electrical length and hence the resonant frequency of said guide.

16. A tunable electrical resonator for translating wave signals within a range of frequencies comprising: a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave signal as incident thereon for modifying the phase velocity thereof; and means including a source of periodic potential for changing with reference to said initial plane the plane of polarization of said wave signal incident on said modifying means, thereby to control the electrical length and hence the resonant frequency of said guide at a rate related to the frequency of said periodic potential.

17. An oscillator for generating wave signals within a range of frequencies comprising: a regenerative oscillatory circuit including a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave signal as incident thereon for modifying the phase velocity thereof; and means for changing with reference to said initial plane the plane of polarization of said wave signal incident on said modifying means, thereby to control the resonant frequency of said guide and thus the resonant frequency of said oscillator.

18. An oscillator for generating wave signals frequency-modulated over a range of frequencies comprising: a regenerative oscillatory circuit including a wave guide having physical dimensions selected so that it resonates in a desired mode at a frequency within said range and having a reflecting impedance discontinuity at one end thereof; means at the other end of said guide for propagating therealong for reflection by said discontinuity a wave signal which is in said range and has a predetermined initial plane of polarization; means in said guide responsive to the plane of polarization of said propagated wave as incident thereon for modifying the phase velocity thereof; and means including a source of a recurrently varying potential for changing with reference to said initial plane the plane of polarization of said wave signal incident on said modifying means, thereby to control in accordance with said recurrent potential variations the resonant frequency of said guide and the frequency of said generated wave signals.

19. A tunable electrical resonator for translating wave signals within a range of frequencies comprising: a hollow circular wave guide having physical dimensions selected so that it resonates in a desired mode at a frequency within said range and having closed ends constituting reflecting impedance discontinuities; means at one end of said guide for propagating therealong for reflection by the discontinuity at the other end a wave signal which is in said range and has a predetermined initial plane of polarization; a dielectric sheet in said guide responsive to the plane of polarization of said propagated wave as incident thereon for modifying the phase velocity thereof; individual windings wound in opposite senses and disposed about said guide near said ends thereof; and a pair of ferrite members axially in said guide disposed at opposite ends of said modifying means and magnetically coupled to said windings and for producing in said members controllable opposing magnetic fields substantially parallel to the axis thereof to rotate about said axis said plane of polarization of said wave signal incident on said modifying means, thereby to control the electrical length and hence the resonant frequency of said guide.

20. An electrical resonator having therein stationary means determining the phase velocity of the exciting electromagnetic wave as a function of the geometric relationship of the plane of polarization of the wave with respect to the means, and means for controlling that relationship to control the resonant frequency of the resonator.

21. An electrical resonator having therein a dielectric member determining the phase velocity of the exciting electromagnetic wave as a function of the geometric relationship between the plane of polarization of the wave and the member, and magnetic means for rotating that plane of polarization to control the resonant frequency of the resonator.

References Cited in the file of this patent

UNITED STATES PATENTS

| | | |
|---|---|---|
| 2,051,537 | Wolff et al. | Aug. 18, 1936 |
| 2,257,783 | Bowen | Oct. 7, 1941 |
| 2,286,428 | Mehler | June 16, 1942 |
| 2,402,948 | Carlson | July 2, 1946 |
| 2,421,725 | Stewart | June 3, 1947 |
| 2,431,103 | Bradley et al. | Nov. 18, 1947 |
| 2,442,671 | Tompkins | June 1, 1948 |
| 2,527,477 | Clapp | Oct. 24, 1950 |
| 2,607,031 | Denis et al. | Aug. 12, 1952 |
| 2,607,849 | Purcell et al. | Aug. 19, 1952 |
| 2,611,094 | Rex | Sept. 16, 1952 |
| 2,630,488 | Clogston | Mar. 3, 1953 |
| 2,644,930 | Luhrs et al. | July 7, 1953 |
| 2,645,758 | Van De Lindt | July 14, 1953 |
| 2,680,229 | Lambert | June 1, 1954 |
| 2,701,344 | Bowen | Feb. 1, 1955 |
| 2,710,922 | Hines | June 14, 1955 |
| 2,748,353 | Hogan | May 29, 1956 |
| 2,769,960 | Mumford | Nov. 6, 1956 |